United States Patent Office 3,242,103
Patented Mar. 22, 1966

3,242,103
REACTION PRODUCTS OF ZINC SALTS WITH METAL HALIDES AND THEIR USE AS CYCLIC OXIDE POLYMERIZATION CATALYSTS
Heinz Uelzmann, Cuyahoga Falls, Ohio, assignor to The General Tire & Rubber Company, Akron, Ohio, a corporation of Ohio
No Drawing. Filed Oct. 25, 1960, Ser. No. 64,695
9 Claims. (Cl. 260—2)

This invention relates to the polymerization of cyclic oxides. More specifically, it relates to methods for the polymerization of organic cyclic oxides, to the polymeric materials obtained from such methods, to catalysts useful in polymerizing organic cyclic oxide materials and to methods for making such catalysts.

It is an object of the present invention to provide a method for polymerizing cyclic oxides.

Another object of this invention is to provide polymeric materials of cyclic oxides.

A further object is to provide catalysts useful in the polymerization of cyclic oxide materials.

A still further object is to provide a method of making catalyst compositions useful in the polymerization of cyclic oxide materials.

These and other objects and advantages of the present invention will become more apparent to those skilled in the art from the following detailed description and examples.

According to the present invention it has been discovered that organic cyclic oxides can readily be polymerized in satisfactory yields to give polymeric materials exhibiting good viscosities by the use of a reaction product (complex, fusion product or the like) of a zinc salt and an aluminum, titanium and/or ferric halide.

The zinc salt is selected from the group consisting of zinc cyanide, zinc oxide, basic zinc carbonate, zinc hydroxide, zinc sulfide, zinc selenide, zinc telluride and the zinc salt of a monocarboxylic aliphatic acid having the formula

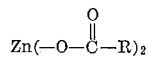

in which R is hydrogen or an alkyl radical of from 1 to 17 carbon atoms. The radical

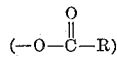

can be the same or different. Examples of the latter compounds are zinc diformate

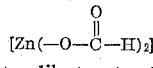

diacetate, dipropionate, dibutyrate, diisobutyrate, dicaproate, divalerate, dicaprate, diheptanoate, dicaprylate, dinonanoate, dilaurate, dipalmitate, distearate, formate-butyrate

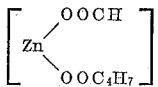

acetate-laurate, caprate-acetate and the like. It is preferred that these compounds be dry or essentially dry, i.e., that they do not contain any free water. Also, it is preferable that they contain essentially little or no water of crystallization although some compounds, such as the

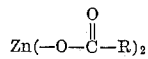

compounds, can contain water of crystallization although this tends to reduce yields. Mixtures of these zinc salts can be used.

The halides to be reacted with the zinc salts to form the catalysts have the following general formulae: $Me(Y)_3$ and $TiOY$ where Me is aluminum, iron or titanium and Y is at least one element selected from the group consisting of fluorine, chlorine, bromine and iodine. Examples of useful materials are $AlF_3$, $AlCl_3$, $AlBr_3$, $AlI_3$, $AlF_2Cl$, $AlCl_2F$, $AlClBr_2$, $AlClBrI$, $FeF_3$, $FeCl_3$, $FeBr_3$, $FeI_3$, $FeCl_2I$, $FeClBr_2$, $FeClBrI$, $FeCl_2F$, $TiF_3$, $TiCl_3$, $TiBr_3$, $TiI_3$, $TiF_2Cl$, $TiBr_2Cl$, $TiBrFCl$, $TiOF$, $TiOCl$, $TiOBr$, $TiOI$, and the like and mixtures thereof. These compounds, also, should be free of or essentially free of occluded water and should be free of or essentially free of water of crystallization.

The zinc salt and the metal halide are reacted together in an inert atmosphere such as one of nitrogen, helium, argon, neon and/or krypton and the like at a temperature sufficient to cause reaction, complex formation, etc. Alternatively, they can be reacted in a sealed vessel from which all or essentially all of the oxygen has been withdrawn or dispersed in an inert liquid which can later be removed, if desired, unless it is a liquid which is also useful in the polymerization process. The zinc salt and metal halide should be mixed together prior to or during reaction. It is preferable to grind and mix the components together in a mill such as a ball or pebble mill rather than a mortar and pestle to make a uniform finely divided and intimate mixture of the ingredients to obtain, after their reaction, a catalyst product which provides higher yields of polymers.

The zinc salt and metals halide should be reacted together at a temperature of at least about 50° C., or higher, to cause complex formation. Temperatures in the range of from about 100 to 450° C. are very useful, while temperatures in the range of from about 160 to 225° C. are preferred to obtain the best catalysts for polymerization of the cyclic oxide monomers. Reaction times will depend on the amount of ingredients, temperatures used and types of compounds employed. The mixture can be agitated or stirred during reaction.

The relative mol ratio of the zinc salt to the aluminum, iron or titanium halide will vary from about 1:0.01 to 1:1. It is preferred that the mol ratio of the zinc salt to the metal halide be from about 1:0.20 to 1:0.60 to obtain the best yields and high molecular weight products.

After the reaction of the zinc salt and metal halide, the product can be cooled, removed from the reactor, pulverized if necessary and dispersed in the organic cyclic oxide monomer. Alternatively, it can be stored under an inert atmosphere or in an inert solvent until it is ready for use.

The cyclic oxides to be polymerized include any cyclic oxide having 1, 2, 3, 4 or more oxygen-carbon rings in which an oxygen atom is joined to 2 or 3 carbon atoms in the ring which will open and polymerize with the same or other cyclic oxide monomers and having up to a total of 70 carbon atoms or more. These monomers, also, may contain 1, 2 or more, preferably only 1, aliphatic carbon-to-carbon double bond. The alkenyl, nitro, ether, ester and halogen (except mono alpha halogen substituted epoxides) substituted derivatives of these cyclic oxides can likewise be employed. The use of monomer mixtures having cyclic oxide monomer(s) containing aliphatic carbon-to-carbon double bond unsaturation in an amount of from about 0.5 to 15 mol percent or higher, the balance being the saturated cyclic oxide monomer(s), permits the resulting copolymer to be cured readily with materials such as sulfur and the like. A very useful mixture is one containing propylene and/or butylene oxide in an amount of from about 95 to 99.5 mol percent and allyl glycidyl ether, vinyl cyclohexene monoxide and/or butadiene monoxide in an amount of 5 to 0.5 mol percent to obtain a crosslinkable (by sulfur) copolymer. Minor amounts, about 0.5–20 mol percent, of a third, fourth or fifth, etc. monomer, such as 1,2-butene oxide, 2,3-hexene oxide, etc. of from 4 to 12 carbon atoms, can be present to break up or to substantially entirely eliminate any crystallinity in the copolymer when desired, especially where only small amounts of an unsaturated monomer are used, and to obtain more flexibility in processing and molding when such is desired.

Examples of useful cyclic oxides are ethylene oxide, propylene oxide, 1,2-butene oxide (or 1,2-epoxy butane), 2,3-butene oxide, 1,2-dodecene monoxide, isobutylene monoxide, styrene oxide, 1,2-pentene oxide, isopentene oxide, 1,2-diisobutylene oxide, 1,2-hexene oxide, 2,3-hexene oxide, 1,2-heptene oxide, allyl glycidyl ether, isoheptene oxide, octene oxide, nonene oxide, decene oxide, hendecene oxide, methyl glycidyl ether, ethyl glycidyl ether, vinyl cyclohexene monoxide, nitro ethylene oxide, butadiene dioxide, phenyl glycidyl ether, 3-methyl-3,4-epoxy butene-1, butadiene monoxide, vinyl cyclohexene dioxide, glycidyl methacrylate, 2,3-diisobutylene oxide, dicyclopentadiene monoxide, limonene dioxide, isoprene monoxide, oxetane ($C_3H_6O$), diglycidyl ether of pentanediol, (3,4-epoxy-6-methyl cyclohexyl methyl)-3,4-epoxy-6-methyl cyclohexane carboxylate, the reaction product of the diglycidyl ether of pentanediol and bisphenol A, 3,3-dimethyl oxetane, 1-epoxy ethyl-3,4-epoxy cyclohexane, 3-allyl-3-methyl oxetane, 3-vinyl-3-methyl oxetane, pentadecene oxide, 3,3-diethyl oxetane, 3-ethyl-3-butyl oxetane, 3-chloro-methylene oxetane, 3-chloro-methyl-3-methyl oxetane, 3-methyl-3-ethyl oxetane, 1,2-epoxy pentacosane, 1,4-dichloro-2,3-epoxy butane, allyl epoxy stearate, hexacontene oxide, heptacontene oxide, the reaction product of the diglycidyl ether of pentanediol and a polyalkylene and/or arylene ether glycol and other cyclic oxides. These cyclic oxides should preferably have a total of from 2 to 25 carbon atoms. Of these materials it is even more preferred to use the lower molecular weight cyclic oxides such as ethylene oxide, propylene oxide, butylene oxide etc. containing from 2 to 12 carbon atoms with minor amounts of unsaturated cyclic oxides, such as allyl glycidyl ether, butadiene monoxide and vinyl cyclohexene monoxide, etc. containing up to 12 carbon atoms. Mixtures of these cyclic oxides can be used.

Where the cyclic oxide monomer contains 2 or more epoxide and/or oxetane groups, it may readily crosslink or gel in the presence of the catalyst to form a resinous rather than a rubbery material. Such materials are very useful in forming potting compounds for delicate electrical and mechanical instruments. Those compounds which have no ethylenic unsaturation may be cured with mixtures of organic peroxides and sulfur or other curing agents.

The catalyst is used in a minor amount by weight only sufficient to catalyze the reaction. Large amounts are usually wasteful and may in time cause reversion or subsequent decomposition of the polymer. In general, there is used a total of from about 0.1 to 12 parts by weight of the catalyst based on a total of 100 parts by weight of the cyclic oxide monomer or monomers being polymerized. However, it is preferred to use a total of from about 0.15 to 5.0 parts by weight of the catalyst based on 100 parts by weight of the monomer(s). The lower catalyst concentrations give higher molecular weight polymers.

The monomers may be polymerized with the catalyst in mass, or in solvent at lower temperatures for longer times. They, also, should be polymerized under inert and/or non-oxidizing conditions, for example, under an atmosphere of nitrogen, argon, neon, helium, krypton or other inert atmosphere. It is sometimes desirable to polymerize in a solvent since this facilitates handling and operation. Alternatively, the inert gas can be omitted and the monomer polymerized in the solvent only under pressure from any vaporized solvent or gaseous monomer. The monomer should be soluble in the solvent which should be an inert or non-reactive solvent. Examples of useful solvents are heptane, octane, cyclohexane, toluene, benzene, trimethylpentane, carbon tetrachloride, chloroform, diethyl ether, trichloroethylene etc. It is preferred to use non-polar hydrocarbon solvents. Since many of the reactants are volatile and to avoid oxidation, the polymerization should be conducted in a closed container and may be under pressure. Polymerization can be conducted at temperatures about 25° C., preferably at temperatures of from about 30° C. to 150° C. If the polymer dissolves in the solvent, it can be precipitated with a non-solvent and recovered, or the solvent can be separated from the polymer by evaporation. The catalyst or catalyst residues can be removed if desired by centrifuging a solution of the polymer. If it is desired to destroy or kill the catalyst, the polymer may be treated with water, alcohol solutions or dilute solutions of acids and the like. Alkaline materials may be used to neutralize the catalyst. The removal of the catalyst will depend upon the ultimate use of the polymer. It is very desirable to polymerize while agitating the contents.

Since the reaction is exothermic and since some monomers may react very rapidly, it may be desirable to reduce the concentration of the catalyst or to use a solvent as above or diluent. Alternatively, the amounts of the catalyst can be changed to speed up the amount and rate of conversion or polymerization.

In the event that any gel forms and where it is not desired to have gel or a crosslinked (resinous) polymer but rather a rubbery or tacky solid polymer, inhibitors may be added. Examples of useful inhibitors are nitrobenzene, dinitrotoluene, dinitrodiphenyl, nitrodiphenyl amine, chlorodinitrobenzene and so forth. In some instances gel formation may be avoided by polymerizing in the dark. Antioxidants such as phenyl beta naphthylamine, also, are desirably added prior to or during polymerization.

Many of the polymers and copolymers etc. obtained by the method of the present invention have a high average molecular weight, i.e., from about 20,000 to 500,000 or higher, as shown by their high viscosities. They may be crystalline (up to 40%) and amorphous or entirely amorphous. The resinous and rubbery polymers are useful as coatings for fabrics, films for packaging materials, elastic fibers, adhesives, and in making tires, tubes, shoe heels, raincoats, rubbery laminates, upholstery materials, floor mats and tiles, molded articles, golf ball covers, centers and cores, sponges, encapsulating compounds and the like. Low molecular weight solid or grease-like polymers of this invention are useful as plasticizers and extenders for natural and synthetic resins and rubbers.

The polymers may be compounded with the usual rubber and resinous compounding materials, such as curing agents, anti-degradants, filters, extenders, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, sulfur, 2-mercapto-benzothiazole, bis-(morpholyl) disulfide, bis(benzothiazyl) disulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl beta naphthylamine, pine oil, mineral oil, hydroquinone monobenzyl ether, mixtures of octylated diphenylamines, styrenated phenols, aldol alpha naphthylamine, diphenyl amine acetone reaction products, antimony oxide, asphalt, coumarone indene resin, natural rubber, polyisoprene, butadiene-styrene rubber or resin, nitrile rubber, acrylonitrile-styrene resin, polyester and/or ether urethanes, polyvinyl chloride and the like and mixtures thereof.

The following examples will serve to illustrate the invention with more particularity to those skilled in the art:

*Example I*

Aluminum chloride (white, colorless, 4 gm.) and 10 gm. of zinc cyanide (colorless) were finely powdered and ground together under nitrogen. The resulting mixture was transferred into a small flask and heated under a stream of nitrogen for 2 hours at 190 to 200° C. Lumps which were formed during the reaction were broken up. The brown material obtained was powdered again in a mortar under nitrogen and then used as a catalyst for the polymerization of propylene oxide.

2.5 gm. of the above brown catalyst were mixed with 50 gm. of propylene oxide in a polymerization bottle under nitrogen. The brown catalyst readily dissolved in the propylene oxide to form a light brown liquid. The bottle was sealed, agitated and heated to a temperature of 80° C. for 38 hours. At the end of this period of time the bottle was opened, and it yielded a dark brown tacky solid (45% conversion to polymer) having a density of 1.0280 and a crystallinity of 26.3%. The polymer had an inherent viscosity of 1.51, and a relative viscosity of 1.66 (0.3359 gm./100 ml. benzene at 25° C.). The percent ash was 2.24%.

It is not precisely known what occurs during the polymerization of propylene oxide using the novel catalysts of the present invention, but it is believed that the following explanation may be helpful in understanding this phenomenon. While aluminum chloride by itself will produce low molecular weight oils of propylene oxide (PO), zinc cyanide due to its insolubility in propylene oxide will provide no or essentially no polymers under normal operating conditions. It is believed that $AlCl_3$ alone initiates the polymerization of the PO; however, because a cationic propagation probably takes place when $AlCl_3$ alone is used, a termination reaction easily occurs by proton abstraction so that only low molecular weight oils are obtained. However, the use of $Zn(CN)_2$ essentially in excess apparently overcomes these difficulties, because, although it alone is insoluble and non-reactive to PO, the $Zn(CN)_2$ is believed to function as a reaction partner (electron donor) with the $AlCl_3$ (electron acceptor) to provide neutralization of the $AlCl_3$ while complexing with the $AlCl_3$. It also, is believed that the $Zn(CN)_2$ does not influence the polymerization (termination) but affords a complex or reaction product in which the catalytic sites are composed of complex ions with two metal atoms of which the cation metal $(ZnCn)^+$ apparently initiates and the complex anion $(AlCl_3CN)^-$ propagates the polymerization of the PO. It is believed that $Zn(CN)_2$ and $AlCl_3$ form a complex or reaction product as follows: $Zn(CN)_2 + AlCl_3 \rightarrow (ZnCN)^+ (AlCl_3CN)^-$.

*Example II*

The method of this example was similar to that of Example I above, except the components used to prepare the catalyst were varied as well as the monomers, amounts, polymerization times and so forth. The catalyst reaction, polymerization conditions and results obtained are shown in Table A, below:

TABLE A

CATALYST PREPARATION

| Run No. | Component "A" | | Component "B" | | Reaction Conditions | |
|---|---|---|---|---|---|---|
| | Type | Gm. | Type | Gm. | Temp., °C. | Time, Hrs. |
| 1 | $AlCl_3$ | 4 | $Zn(CN)_2$ | 10 | 195–205 | 2.17 |
| 2 | $AlCl_3$ | 4 | $Zn(CN)_2$ | 10 | 195–205 | 2.17 |
| 3 | $AlCl_3$ | 4 | $Zn(CN)_2$ | 10 | 195–205 | 2.17 |
| 4 | $AlCl_3$ | 4 | $Zn(CN)_2$ | 10 | 195–205 | 2.17 |
| 5 | $AlCl_3$ | 4 | $Zn(CN)_2$ | 10 | 195–205 | 2.17 |
| 6 | $AlCl_3$ | 4 | $Zn(CN)_2$ | 10 | 195–205 | 2.17 |
| 7 | $AlCl_3$ | 4 | $Zn(CN)_2$ | 10 | 195–205 | 2.17 |
| 8 | $AlCl_3$ | 4 | $Zn(CN)_2$ | 10 | 195–205 | 2.17 |
| 9 | $AlCl_3$ | 4 | $Zn(CN)_2$ | 10 | 195–205 | 2.17 |
| 10 | $AlCl_3$ | 4 | $Zn(CN)_2$ | 10 | 195–205 | 2.17 |
| 11 | $AlCl_3$ | 8 | ZnO | 20 | 200 | 2 |
| 12 | $AlCl_3$ | 4 | Basic Zn Carbonate | 10 | 200 | 2 |
| 13 | $AlCl_3$ | 13.34 | $Zn(OH)_2$ | 9.94 | 200 | 2 |
| 14 | TiOCl | 4 | $Zn(CN)_2$ | 10 | 200 | 2 |
| 15 | $TiCl_3$ (Al reduced) | 4 | $Zn(CN)_2$ | 10 | 200 | 2 |
| 16 | $TiCl_3$ | 4 | $Zn(CN)_2$ | 10 | 200 | 2 |
| 17 | $AlCl_3$ | 4 | Zn Acetate | 10 | 200 | 2 |
| 18 | $AlCl_3$ | 4 | Zn Acetate (Anhydrous) | 10 | 200 | 2 |
| 19 | $FeCl_3$ | 4 | Zn Cyanide | 10 | 200 | 2 |
| 20 | $FeCl_3$ | 4 | Zn Sulfide | 10 | 200 | 2 |
| 21 | $AlCl_3$ | 12 | Zn Cyanide | 30 | 200 | d 2 |

POLYMERIZATION

| Run No. | Monomer Type | Monomer Gm. | Catalyst, Gm. | Pzn. Temp., °C. | Pzn. Time, Hrs. | Yield, percent | Density, gm./cc. |
|---|---|---|---|---|---|---|---|
| 1 | PO [b] | 38.5 | 0.115 | 80 | 164 | 27.5 | 1.013 |
|   | AGE [b] | 1.5 | | | | | |
| 2 | PO | 23.5 | 0.23 | 80 | 97 | 25 | 1.025 |
|   | AGE | 1.5 | | | | | |
| 3 | PO | 23.5 | 0.46 | 80 | 97 | 36 | 1.030 |
|   | AGE | 1.5 | | | | | |
| 4 | PO | 23.5 | 0.69 | 80 | 97 | 40 | 1.030 |
|   | AGE | 1.5 | | | | | |
| 5 | PO | 23.5 | 0.92 | 80 | 97 | 40 | 1.040 |
|   | AGE | 1.5 | | | | | |
| 6 | PO | 23.5 | 1.15 | 80 | 90 | 36 | 1.035 |
|   | AGE | 1.5 | | | | | |
| 7 | PO | 316.0 | 0.73 | 80 | 112 | 48.3 | 1.0130 |
|   | AGE | 17.0 | | | | | |
| 8 | PO | 340.0 | 0.875 | 80 | 96 | 42.5 | 1.0125 |
|   | AGE | 10.0 | | | | | |
| 9 | PO | 340.0 | 0.875 | 80 | 96 | 45.1 | 1.0135 |
|   | VCHMO [b] | 10.0 | | | | | |
| 10 | PO | 340.0 | 0.875 | 80 | 96 | 43.7 | 1.0150 |
|   | BDMO [b] | 10.0 | | | | | |
| 11 | PO | 21.8 | 0.9 | 80 | 104 | 16 | |
| 12 | PO | 23.5 | 1.5 | 80 | 96 | 28.6 | 1.011 |
| 13 | PO | 16.6 | 1.7 | 80 | 96 | 23.5 | 1.0255 |
| 14 | PO | 340.0 | 0.875 | 80 | 85 | 14 | 1.0150 |
| 15 | PO | 340.0 | 0.875 | 80 | 85 | 12 | 1.0165 |
| 16 | PO | 340.0 | 0.875 | 80 | 85 | 21 | 1.0140 |
| 17 | PO | 300.0 | 3.0 | 80 | 112 | 10 | |
| 18 | PO | 300.0 | 3.0 | 80 | 96 | 49.2 | 1.0220 |
| 19 | PO | 300.0 | 2.5 | 80 | 148 | 10 | |
| 20 | PO | 300.0 | 2.5 | 80 | 148 | 50 | |
| 21 | PO | 100.0 | 1.0 | 80 | 100 | 60 | |

PRODUCT DESCRIPTION

| Run No. | Relative Crystallinity, percent | Viscosity [a] Inherent | Viscosity [a] Relative | Viscosity [a] Conc., gm./100 ml. | Ash, percent |
|---|---|---|---|---|---|
| 1 | 10 | 2.69 | 1.988 | 0.2551 | |
| 2 | 23.6 | 1.63 | 1.568 | 0.2754 | |
| 3 | 28.4 | 1.39 | 1.432 | 0.2575 | |
| 4 | 28.4 | 1.23 | 1.364 | 0.2523 | |
| 5 | 38.9 | 2.01 | 1.290 | 0.1266 | |
| 6 | 33.6 | 0.895 | 1.364 | 0.3469 | |
| 7 | 10 | 2.9 | 1.344 | 0.1020 | 0.3 |
| 8 | 9.5 | 2.08 | 1.229 | 0.0996 | 0.31 |
| 9 | 10.6 | 2.04 | 1.229 | 0.1009 | 0.44 |
| 10 | 12.2 | 2.09 | 1.234 | 0.1007 | 0.31 |
| 11 | | | | | |
| 12 | 8.4 | 1.4 | 1.15 | 0.1006 | 2.12 |
| 13 | 23.6 | 1.86 | 1.192 | 1.73 | 0.0944 |
| 14 | 12.2 | 1.09 | 1.394 | 0.3040 | |
| 15 | 13.9 | 0.815 | 1.290 | 0.3126 | |
| 16 | 11.1 | 0.767 | 1.283 | 0.3248 | |
| 17 | | | | | |
| 18 | 19.8 | 0.893 | 1.308 | [c] .3008 | 1.29 |
| 19 | | | | | |
| 20 | | | | | |
| 21 | | | | | |

PRODUCT DESCRIPTION

| Run No. | PBNA, Percent [b] | Unsaturation, meq./gm.[f] | Appearance |
|---|---|---|---|
| 1 | 0.01 | 0.472 | Light tacky solid. |
| 2 | 0.06 | 0.722 | Dark brown tacky solid. |
| 3 | 0.08 | 0.728 | Do. |
| 4 | 0.10 | 0.755 | Do. |
| 5 | 0.11 | 0.871 | Do. |
| 6 | 0.14 | 0.771 | Do. |
| 7 | | | Brown rubbery solid. |
| 8 | | 2.68 | Light rubbery solid. |
| 9 | | 0.86 | Light rubbery tacky solid. |
| 10 | | 3.30 | Do. |
| 11 | | | White tacky solid. |
| 12 | | | White leathery solid. |
| 13 | 4.15 | 0.108 | Dark non-rubbery tacky solid. |
| 14 | | 0.038 | Light brown tacky solid. |
| 15 | | 0.033 | White tacky solid. |
| 16 | | 0.019 | Cream colored sticky solid. |
| 17 | | | Dull yellow grease. |
| 18 | 0.050 | | Lt. color sticky, low MW solid. |
| 19 | | | Low MW grease. |
| 20 | | | Low MW solid. |
| 21 | | | |

[a] Dilute solution viscosities measured in benzene at 25° C.
[b] PO = propylene oxide, AGE = allyl glycidyl ether, VCHMO = vinyl cyclo-hexene monoxide, BDMO = butadiene monoxide-1,2, and PBNA = phenyl beta naphthylamine.
[c] Viscosity measured in isopropanol at 60° C.
[d] Mixed for 3 days in a ball mill prior to reaction resulted in an increase in polymer yield of from 45 to 60%.
[e] Although amounts in grams, B is in a molar excess over A.
[f] Milliequivalents of C=C per gram of polymer.

These results show the many variations which can be made in the practice of the method of the present invention to obtain polymers of cyclic oxides.

When zinc oxalate, pure zinc carbonate, CdO or CdS (10 g.) was used in place of $Zn(CN)_2$ and reacted with $AlCl_3$ (4 g.) at 200° C. for 2 hours under $N_2$, no polymer was formed from propylene oxide under polymerization conditions similar to the above. On the other hand, when $MoCl_5$, $CbCl_5$ or $WCl_6$ (4 g.) was heated with the $Zn(CN)_2$ (12 g.) under similar conditions and then the resulting material mixed with propylene oxide according to the above polymerization procedures, no polymers were formed. Furthermore, when a material was prepared using a molar excess of $AlCl_3$ or $FeCl_3$ over $Zn(CN)_2$ under conditions similar to the above and essentially the same polymerization procedure followed for propylene oxide, only light oils or no polymers were obtained. These latter procedures and results show the criticality in the use of certain compounds to make the catalysts and in the use of certain amounts of catalyst forming materials.

It is to be understood that in accordance with the provisions of the patent statutes the particular compositions, products and methods described and set forth herein are presented for purposes of explanation and illustration and that various modifications of said compositions, products and methods can be made without departing from this invention.

What is claimed is:

1. A composition useful for the polymerization of epoxides and oxetanes consisting of the reaction product of A and B in the mol ratio of from about 1.0:0.01 to 1.0:1.0 and in an inert medium at a temperature of about 50 to 450° C., A being a compound selected from the group consisting of zinc cyanide, zinc oxide, basic zinc carbonate, zinc hydroxide, ZnX and

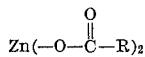

and mixtures thereof, where X is selected from the group consisting of sulfur, selenium and tellurium and where R is a material selected from the group consisting of hydrogen and an alkyl radical of from 1 to 17 carbon atoms, and B being a compound having the general formulae and being selected from the group consisting of $Me(Y)_3$ and TiOY, and mixtures thereof, where Me is selected from the group consisting of aluminum, iron and titanium and where Y is an element selected from the group consisting of fluorine, chlorine, bromine and iodine, and mixtures thereof.

2. A composition according to claim 1 in which the mol ratio of A to B is from about 1.0:0.20 to 1.0:0.60 and where A and B have been reacted at a temperature of from about 160 to 225° C.

3. A composition according to claim 2 where A is zinc cyanide and B is aluminum chloride.

4. The method for making a composition useful for polymerizing epoxides and oxetanes which comprises reacting together in an inert medium at a temperature of from about 50 to 450° C. A and B in the mol ratio of from about 1.0:0.01 to 1.0:1.0, A being a compound selected from the group consisting of zinc cyanide, zinc oxide, basic zinc carbonate, zinc hydroxide, ZnX, and

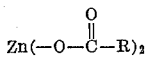

and mixtures thereof, where X is selected from the class consisting of sulfur, selenium and tellurium and where R is a material selected from the class consisting of hydrogen and an alkyl radical of from 1 to 17 carbon atoms, and B being a compound having the general formulae and being selected from the group consisting of $Me(Y)_3$ and TiOY and mixtures thereof, where Me is selected from the group consisting of aluminum, iron and titanium and where Y is an element selected from the group consisting of fluorine, chlorine, bromine, and iodine and mixtures thereof.

5. The method according to claim 4 in which the inert medium is of a gas selected from the group consisting of nitrogen, helium, neon, argon and krypton, in which the temperature during the reaction is from about 160 to 225° C., where the molar ratio of A to B is from about 1.0:0.20 to 1.0:0.60, and where A and B are finely divided and in intimate admixture with each other.

6. The method which comprises, under an inert atmosphere, mixing (I) at least one polymerizable organic cyclic oxide monomer having a saturated ring of from 2 to 3 carbon atoms and one oxygen atom and a total of from 2 to 25 carbon atoms in admixture with (II) a minor amount by weight sufficient to polymerize said cyclic oxide of a catalytic composition and polymerizing said oxide in admixture with said composition by means of said ring to form a polyether having a molecular weight of at least 20,000, said composition comprising essentially the reaction product of A and B in the molar ratio of from about 1.0:0.01 to 1.0:1.0 and in an inert medium at a temperature of from about 50 to 450° C., A being a compound selected from the group consisting of zinc cyanide, zinc oxide, basic zinc carbonate, zinc hydroxide, ZnX and

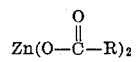

and mixtures thereof, where X is selected from the group consisting of sulfur, selenium and tellurium and where R is a material selected from the group consisting of hydrogen and an alkyl radical of from 1 to 17 carbon atoms, and B being a compound having the general formulae and being selected from the group consisting of $Me(Y)_3$ and TiOY, and mixtures thereof, where Me is selected from the group consisting of aluminum, iron and titanium and where Y is an element selected from the group consisting of fluorine, chlorine, bromine and iodine, and mixtures thereof.

7. The method according to claim 6 where the relative proportions of (I) to (II) are from about 100:0.1 to 100:12.0 parts by weight.

8. The method according to claim 6 where said cyclic oxide has a total of from 2 to 12 carbon atoms and one saturated ring of two carbon atoms and one oxygen atom, where A and B have been reacted at a temperature of from about 160 to 225° C., where the molar ratio of A to B is from about 1.0:0.20 to 1.0:0.60, and where the relative proportions of (I) and (II) are from about 100:0.15 to 100:5.0 parts by weight.

9. The method according to claim 8 in which A is zinc cyanide and B is aluminum chloride.

References Cited by the Examiner

UNITED STATES PATENTS

| | | | |
|---|---|---|---|
| 1,625,924 | 4/1927 | Woodruff et al. | 252—441 |
| 2,870,101 | 1/1959 | Stewart | 260—2 |
| 3,009,887 | 11/1961 | Kaiser | 260—2 |
| 3,072,628 | 1/1963 | Coover et al. | 252—441 |

OTHER REFERENCES

Jander et al.: Z. anarg. Allgem. Chem. 231, pp. 345–64 (1937), C.A. 31:4867.

Chemical Abstracts, vol. 31, p. 4867 (1937).

WILLIAM H. SHORT, *Primary Examiner.*

B. MANGAN, J. R. LIBERMAN, *Examiners.*